United States Patent [19]

Lyutzkanov et al.

[11] Patent Number: 4,555,995
[45] Date of Patent: Dec. 3, 1985

[54] THERMAL INSULATION OF INDUSTRIAL FURNACE CROWNS

[75] Inventors: Stoyan S. Lyutzkanov, Sofia; Dimiter K. Bojkov, Plovdiv, both of Bulgaria

[73] Assignee: Stopansko Obedinenie "Quarz", Sofia, Bulgaria

[21] Appl. No.: 612,851

[22] Filed: May 22, 1984

[30] Foreign Application Priority Data

Jun. 30, 1983 [BG] Bulgaria .................................. 61536

[51] Int. Cl.[4] ............................................. F23M 5/06
[52] U.S. Cl. .................................... 110/335; 110/181
[58] Field of Search ............... 110/331, 332, 333, 334, 110/335, 336, 172, 181; 432/247, 250

[56] References Cited

U.S. PATENT DOCUMENTS

| 1,804,957 | 5/1931 | Shellenberger | 110/332 |
| 2,011,701 | 8/1935 | Anderson | 110/334 |
| 2,139,172 | 12/1938 | Nichols | 110/335 |
| 2,321,813 | 6/1943 | Henzel | 110/336 |
| 2,829,877 | 4/1958 | Davis, Jr. | 110/336 |
| 3,246,442 | 4/1966 | Sauer | 110/336 |

FOREIGN PATENT DOCUMENTS

| 34607 | 3/1978 | Japan | 110/336 |
| 967561 | 8/1964 | United Kingdom | 110/336 |
| 975329 | 11/1964 | United Kingdom | 110/336 |

OTHER PUBLICATIONS

"The Glass Industry", Brandt, Patel, Thomas, 08-1981, pp. 12-18.
"Glass", Boggum and Glasser, 1968, Nos. 6254 and 7307.
"American Ceramic Society Bulletin", Koker, 1971, No. 7300.
"Glass", Nakayama and Brown, 1975, No. 2236.
"Glass Technology", MacGovern, 1972, vol. 13, No. 2, pp. 37-39.

Primary Examiner—Albert J. Makay
Assistant Examiner—Steven E. Warner

[57] ABSTRACT

Thermal insulation for crowns and other industrial furnace parts having a surface subject to insulation. A reinforcing lattice made up of sectors is formed on such surface, such sectors are filled by refractory material. An adhesive protection layer made of material which is hardenable under the affect of the heat radiated from the furnace is then applied over the sectors of the refractory insulation material.

3 Claims, 3 Drawing Figures

THERMAL INSULATION OF INDUSTRIAL FURNACE CROWNS

This invention relates to thermal insulation for industrial furnace crowns, and other industrial furnace parts, especially of the main crown and the glass kiln regenerative crowns and other parts of furnaces and kilns.

There is a known glass kiln crown heat insulation according to which several layers of insulation refractory bricks, separately or in combination with insulation concrete or ceramic fiber blanket are laid on the furnace crown.

Such prior insulation is disclosed by Brandt, Patel, Thomas, "The Glass Industry", 1981, No. 8, 12; Bogum, Glasser, "Glass", 1968, No. 6, 254, and No. 7, 307; and Koken, "American Ceramic Society Bulletin" 1971, No. 7, 300.

There is also another known glass kiln heat insulation according to which the kiln crown is covered by a ceramic fiber insulation blanket. This is disclosed in Nakajama, Brown, "Glass", 1975, No. 2, 236.

These insulations have the following disadvantages: the porous silica bricks are quite heavy and have rather limited insulation characteristics. If the insulation layer is made thicker, their characteristics do not increase proportionally, since the thermal conductivity of this type of bricks increases considerably at higher temperatures. Another important disadvantage is that when a hole opens in the main crown, this hole does not always coincide with the hole formed in the insulation, and a large sector of the insulation has to be removed in order to make repairs. This is disclosed in MacGovern, "Glass Technology", 1972, No. 2, 37.

When the crown is fiber blanket insulated there is a risk of chemical reaction with silica blocks at interface temperatures exceeding 1000° C. This process is further intensified by the access of burden dust. A general disadvantage of all solutions above is the high insulation costs.

It is the object of this invention to provide a heat insulation for crowns and other parts of industrial furnances or kilns and other parts of industrial furnaces wherein low cost insulation of high mechanical strength is produced such insulation having a long operational life and being easily maintained.

This object is achieved by a heat insulation for crowns and other parts of industrial furances by making a reinforcement lattice consisting of individual sectors which are filled by insulation fireclay material, a protective adhesive layer being applied on them. The refractory insulation body and the protection adhesive layer harden under the effect of the heat radiated from the furnace. The reinforcement lattice is made of refractory insulation bricks fitted to the underlying surfaces for insulation by means of a buffer layer. The buffer layer is chemically inert at temperatures under 1400° C.

Such layer consists of the following components in weight-percents:

quartz sand 40–60, refractory ball clay 8–15, alumino-phosphate bond 8–15, and water 20–30. The reinforcement lattice is formed of refractory insulation bricks forming boundary sector walls, preferably having rectangular shapes. These sectors are filled by fireclay material containing the following components: 20–35 weight percent (w.p.) refractory ball clay, 2–25 w.p. quartz sand, 10–20 w.p. alumino-phosphate bond, 20–40 w.p. water and 120–150 parts by volume of burning organic additives to 100 w.p. of the mixture of the remaining components. What is characteristic for this body is that it is chemically inert to the surfaces due to be insulated at temperatures under 1400° C. The sectors are fully filled by refractory insulation material, and the thickness of this layer corresponds to the height of the reinforcement lattice.

Another worth noticing characteristic of this invention is that a thermo-sensitive layer changing its color by rising temperatures is applied on the protection adhesive layer, thus enabling the production of early information about any local masonry overheating in the furnace insulated sector. The following composition in parts by weight are used for applying the thermo-sensitive layer: 20–30 refractory ball clay, 30–40 alumino-phosphate bond, and 30–40 water.

The advantages of this invention in comparison with wellknown insulations are: high mechanical strength, low weight, long operational life, and low costs. Furthermore, in the case of any hole formation there is a coincidence between the holes in the crown and in the insulation. There is no risk of chemical interaction between the insulation components and the insulated surface at high temperatures.

A preferred embodiment is shown in the accompanying drawing, in which.

Figure 1:
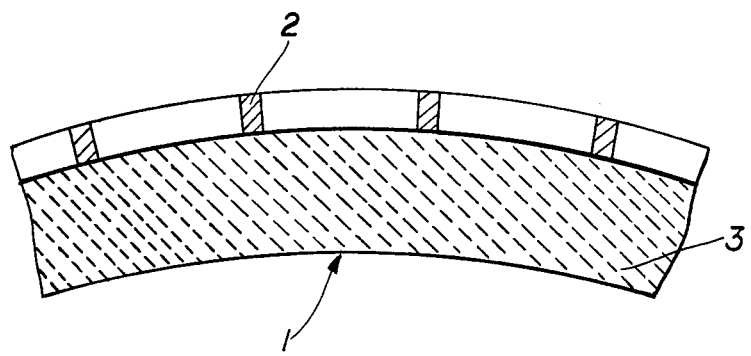
FIG. 1 is a view in section of an industrial furnace crown.
Figure 2:
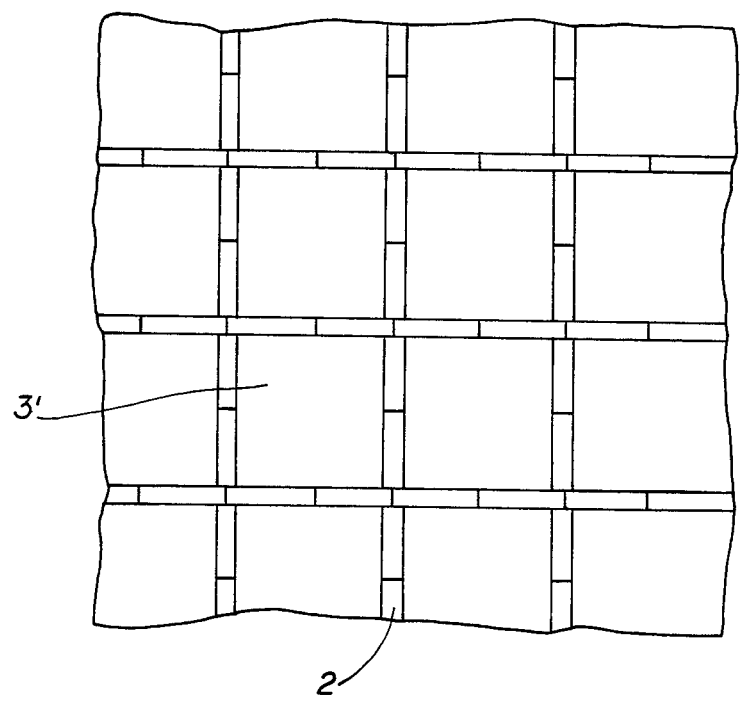
FIG. 2 is top view of the crown of FIG. 1.
Figure 3:
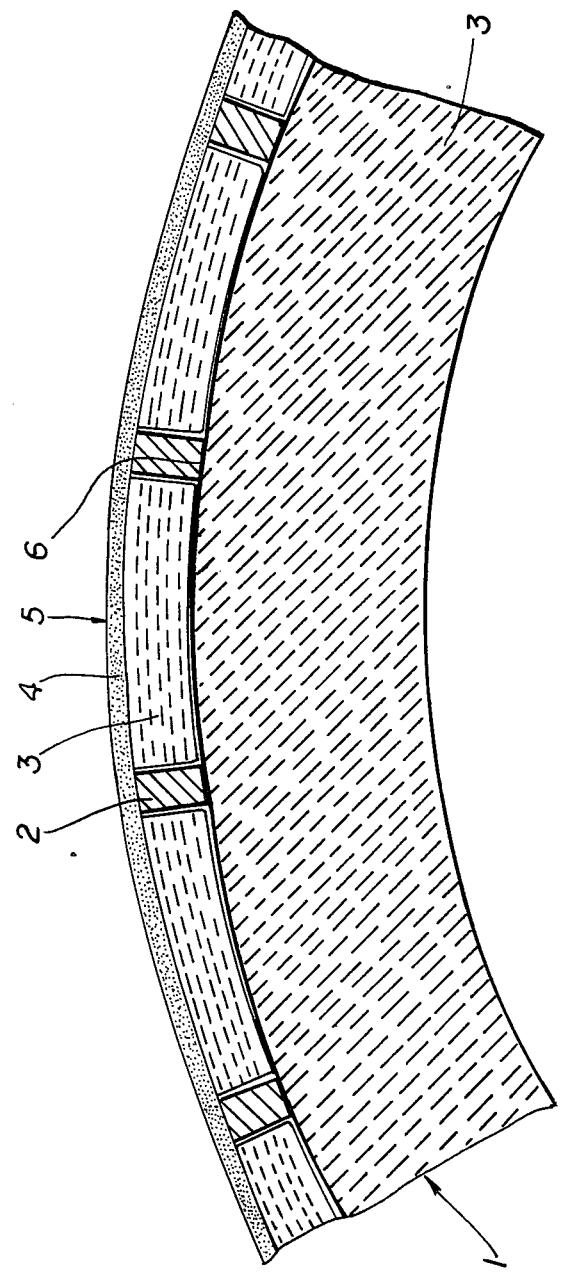
FIG. 3 is a view section of the finished multi-layer insulation in accordance with this invention.

According to the invention, the insulated crown of the industrial furnace consists of crown 1, on which a lattice 2 is built consisting of refractory insulation bricks forming sectors, preferably having rectangular shapes. The sectors 3' are later filled by fireclay insulation material 3. A protective adhesive layer 4 is applied on lattice 2 and the refractory insulation sectors 3'. On top of layer 4 there is placed a thermosensitive layer 5. Lattice 2 and sectors 3', which are filled by refractory insulation material 3 forming a common insulation layer. The bricks of lattice 2 are fitted to crown 1 of the furance by means of a buffer layer 6.

The heat insulation of the crown and other parts of the industrial furance described here, made of silica bricks, is made in the following manner:

Initially the reinforcing lattice 2 of refractory insulation bricks is made, the latter being fitted to the underlying part for insulation by means of a buffer layer 6. Then the empty fields or sectors 3' by the refractory insulation bricks of lattice 2 are filled by fireclay insulation material 3 which is produced by mixing the following components in parts by weight: 25 parts refractory ball clay, 15 parts quartz sand, 20 parts alumino-phosphate bond, and 40 parts of water. To every 100 kg of this mixture there are added 150 liters of rice husks, the mixture is homogenized again, and then is ready for use. After the refractory material hardens under the affect of heat radiated from the furance, the protection adhesive layer 4 is applied on the reinforcing lattice 2 and the sectors or fields 3', which are filled by refractory insulation material 3. The adhesive layer 4 consists of the following components in weight parts: 55 parts quartz sand, 10 refractory clay, 15 parts alumino-phosphate bond, and 20 parts water. After the protection adhesive layer 4 hardens under the heat radiated from the furnace, thermoresistant layer 5 is applied over it. Layer 5 is produced by mixing the following components in weight parts: 25 parts refractory ball clay, 40 parts alumino-phosphate bond and 35 parts water which completes the making of the heat insulation.

In insulation of a crown or other parts of an industrial furnace made of magnesia-chromite bricks, the sequence of operations is the same except that the refractory insulation material is produced by mixing the following components in weight parts: 25 parts refractory ball clay, 5 parts quartz sand, 25 parts alumino-phosphate bond, and 40 parts water. To every 100 kg of the mixture made in this way, 150 liters of rice husks are added, and the mixture is again homogenized.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. Thermal insulation for crowns and other industrial furnace parts having a surface to insulation, comprising a reinforcing lattice on such surface, the lattice being made of sectors which are filled by refractory insulation material, with an adhesive protection layer applied over the sectors; refractory insulation material and the adhesive protection layer being hardenable under the affect of the heat radiated from the furnace, the refractory insulation material containing the following components in weight parts:
   refractory ball clay: 20–35
   quartz sand: 2–25
   alumino-phosphate bond: 10–20
   water: 25–40
   burning organic additives: 120–150 volumes parts, compared with on the basis of 100 parts by volume of the mixture of the remaining components.

2. Insulation in accordance with claim 1, wherein the refractory insulation materials are chemically inert to the surfaces subject to insulation at temperatures under 1400° C.

3. Thermal insulation for crowns and other industrial furance parts having a surface subject to insulation, comprising a reinforcing lattice on such surface, the lattice being made of sectors which are filled by refractory insulation material, with an adhesive protection layer applied over the sectors; refractory insulation material, and the adhesive protection layer being hardenable under the affect of the heat radiated from the furance, a thermo sensitive layer which changes its color when the temperature rises is applied over the protection adhesive layer, the thermosensitive layer has the following composition in parts by weight:
   refractory ball clay: 20–30
   alumino-phosphate bond: 30–40
   water: 30–30

* * * * *